US012768963B2

(12) United States Patent
Yan et al.

(10) Patent No.: US 12,768,963 B2
(45) Date of Patent: Oct. 20, 2026

(54) METHOD FOR ROADSIDE ASSISTED SENSOR DEVIATION CORRECTION IN SIMULTANEOUS LOCALIZATION AND MAPPING

(71) Applicant: Hong Kong Applied Science And Technology Research Institute Co., Ltd., Shatin (HK)

(72) Inventors: Jiaxin Yan, Shenzhen (CN); Xinghua Zhu, Shenzhen (CN); Hang Chen, Kowloon Bay (HK); Jiashi Feng, Shenzhen (CN); Alpamys Urtay, Pak Shek Kok (HK); Dongzhe Su, Shenzhen (CN); Shijun Fan, Fanling (HK)

(73) Assignee: Hong Kong Applied Science And Technology Research Institute Co. Ltd, Shatin (HK)

( * ) Notice: Subject to any disclaimer, the term of this patent is extended or adjusted under 35 U.S.C. 154(b) by 449 days.

(21) Appl. No.: 18/224,321

(22) Filed: Jul. 20, 2023

(65) Prior Publication Data

US 2025/0028034 A1 Jan. 23, 2025

(51) Int. Cl.
*G01S 7/497* (2006.01)
*B60W 60/00* (2020.01)
(Continued)

(52) U.S. Cl.
CPC .............. *G01S 7/497* (2013.01); *G01S 17/50* (2013.01); *G01S 17/89* (2013.01); *B60W 60/001* (2020.02);
(Continued)

(58) Field of Classification Search
CPC .......... G01S 7/497; G01S 17/50; G01S 17/89; G01S 7/4808; G01S 17/86; G01S 17/931;
(Continued)

(56) References Cited

U.S. PATENT DOCUMENTS 10,481,277 B2 11/2019 Schmid
11,113,959 B2 * 9/2021 Alam .................... H04W 4/40
(Continued)

FOREIGN PATENT DOCUMENTS

CN 112767475 A 5/2021
CN 113763738 A 12/2021
(Continued)

OTHER PUBLICATIONS

Machine translation of CN 115690746 retrieved from Clarivate Analytics on Mar. 7, 2026 (Year: 2026).*
(Continued)

*Primary Examiner* — Thomas Ingram
(74) *Attorney, Agent, or Firm* — GableGotwals

(57) ABSTRACT

A method for position and/or deviation correction of a moving object in a simultaneous localization and mapping (SLAM) environment. The method comprises receiving at the moving object point cloud data for an area associated with the moving object from a sensor located at a fixed location. A processor of the moving object performs the steps of: transforming the received point cloud data to a coordinate system of the moving object; matching the transformed point cloud data with point cloud data generated by a sensor at the moving object for the area associated with the moving object; and using the matched point cloud data to determine a corrected position and/or deviation of the moving object within a selected coordinate system.

12 Claims, 6 Drawing Sheets

(51) Int. Cl.
*G01S 17/50* (2006.01)
*G01S 17/89* (2020.01)
*G08G 1/0967* (2006.01)

(52) U.S. Cl.
CPC . *B60W 2420/408* (2024.01); *G08G 1/096783* (2013.01)

(58) Field of Classification Search
CPC .......... B60W 60/001; B60W 2420/408; G08G 1/096783
See application file for complete search history.

(56) References Cited

U.S. PATENT DOCUMENTS

| | | | | |
|---|---|---|---|---|
| 11,698,272 | B2 * | 7/2023 | Kroepfl | G01C 21/3841 701/409 |
| 2019/0304197 | A1 * | 10/2019 | Sisbot | G06T 19/006 |
| 2019/0339082 | A1 | 11/2019 | Doig et al. | |
| 2021/0263167 | A1 | 8/2021 | Chen et al. | |
| 2024/0045064 | A1 * | 2/2024 | Xu | G01S 17/89 |
| 2024/0094395 | A1 * | 3/2024 | Wei | G01S 7/497 |
| 2025/0033662 | A1 * | 1/2025 | Krüger | G01C 21/3407 |
| 2025/0252585 | A1 * | 8/2025 | Shan | G06T 7/337 |

FOREIGN PATENT DOCUMENTS

| | | | |
|---|---|---|---|
| CN | 114155415 | A | 3/2022 |
| CN | 114877883 | A | 8/2022 |
| CN | 115143952 | A | 10/2022 |
| CN | 115578709 | A | 1/2023 |
| CN | 115690746 | A | 2/2023 |
| CN | 115775378 | A | 3/2023 |
| CN | 116148821 | A | 5/2023 |
| CN | 116189138 | A | 5/2023 |
| WO | 2022159173 | A1 | 7/2022 |

OTHER PUBLICATIONS

Liu et al, "EdgeSharing: Edge Assisted REal-time Localization and Object Sharing in Urban Streets", Jul. 26, 2021, Publisher: IEEE INFOCOM 2021.

Quack et al, "Digital Map Generation and Localization for Vehicles in Urban Intersections using LiDAR and GNSS Data", IFAC PapersOnLine, , pp. 251-257, vol. 50-1, Publisher: International Federation of Automatic Control 2017.

* cited by examiner

METHOD FOR ROADSIDE ASSISTED SENSOR DEVIATION CORRECTION IN SIMULTANEOUS LOCALIZATION AND MAPPING

FIELD OF THE INVENTION

The present invention relates to V2X communication technology. In particular, the invention relates to a method for roadside assisted vehicle sensor deviation correction in simultaneous localization and mapping (SLAM) including, but not limited to, a method for position and/or deviation correction of a moving object in a SLAM environment, and/or a method for position and/or deviation correction of an autonomous vehicle (AV) in a SLAM environment.

BACKGROUND OF THE INVENTION

Autonomous Vehicles (AVs) are vehicles configured with an aim to assist or replace human drivers by automating at least some of the driving tasks. In contrast to conventional vehicles which have typically been configured to use only real-time data retrieved from on-board vehicle modules such as visual sensors to determine or detect potential threats on the road, AVs utilize the Vehicle-to-Everything (V2X) communications protocol, which is a vehicular communication protocol configured to deliver information from a vehicle to any entity that may affect the vehicle, and vice versa. The V2X protocol assists by enabling communicating information and/or data exchanges between vehicle on-board units (OBUs) and, for example, roadside infrastructure for road safety, management, and/or threat determination purposes. A V2X system incorporates other more specific types of communications including, but not limited to, Vehicle-to-Infrastructure (V2I), Vehicle-to-Vehicle (V2V), Vehicle-to-Pedestrian (V2P), Vehicle-to-Device (V2D), and Vehicle-to-Grid (V2G), etc.

Very often, AVs are equipped with sensors for collecting point clouds; a point cloud comprising a collection of individual data points in a three-dimensional space, with each data point being assigned with a set of coordinates within the X, Y, and Z axes. Point cloud data is particularly useful in object detection, path planning and vehicle control by the AVs. Similarly, road-side units (RSUs) such as road-side sensors or other connectivity devices may also be capable of collecting point cloud data, and subsequently, transmitting the point cloud data to edge servers or the like through Cellular-Vehicle-to-Everything (C-V2X) channels.

In traditional SLAM architecture for autonomous driving, loop-closure is used to reduce accumulated error by checking if somewhere is revisited by the AV. When a loop (i.e., a revisited position) is found, a location-equality condition is added to a back-end bundle adjustment (BA), which performs constrained global optimization over all history keyframes of the AV's point cloud data, in order to minimize accumulated error in the AV's current trajectory.

During the process of SLAM, accumulation of errors is unavoidable. Long-term error accumulation will lead to unreliable results, which means it is difficult to build globally consistent vehicle trajectories and maps. Thus, in autonomous driving, loop-closure detection (also called loop detection) is widely used to solve this problem. Using loop-closure detection, previous back-end optimized trajectory is corrected and accumulated errors reduced or eliminated. Loop-closure detection is very important for improving the accuracy and robustness of the whole SLAM system.

Traditional loop-closure detection highly relies on choosing one or more key frames from point cloud data to calculate a similarity between frames for judging whether the frames relate to the same location. Besides, loop-closure detection requires that the AV must arrive at the same position so the loop-closure can be generated. However, in outdoor environments, it may take a long time for the AV to return to the same position, which means the deviation correction of loop-closure frequency is too low to correct accumulated errors in time. Thus, the loop-closure detection is not efficient enough to meet this need. Furthermore, the comparison of key frames is not conducted consistently using an accurate world coordinate system, which may lead to wrong matching of frames such that deviations of the AV from the world coordinate system cannot be eliminated.

There is a need to develop a method to correct accumulated errors of AV pose estimation without needing loop closure detection.

OBJECTS OF THE INVENTION

An object of the invention is to mitigate or obviate to some degree one or more problems associated with known systems and methods for correcting accumulated errors in AV pose in a SLAM environment.

Another object of the invention is to provide an improved method for position and/or deviation correction of a moving object in a SLAM environment.

A further object of the invention is to provide an improved method for position and/or deviation correction of an autonomous vehicle (AV) in a SLAM environment.

A yet further object is to provide an improved method for roadside assisted vehicle sensor deviation correction in SLAM.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method for position and/or deviation correction of a moving object in a simultaneous localization and mapping (SLAM) environment. The method comprises receiving at the moving object point cloud data for an area associated with the moving object from a sensor located at a fixed location. A processor of the moving object performs the steps of: transforming the received point cloud data to a coordinate system of the moving object; matching the transformed point cloud data with point cloud data generated by a sensor at the moving object for the area associated with the moving object; and using the matched point cloud data to determine a corrected position and/or deviation of the moving object within a selected coordinate system.

Preferably, but not exclusively, the SLAM environment comprises a road system, the moving object comprises an AV navigating its way around the road system, the processor forms part of an on-board unit (OBU) of the AV, the sensor of the moving object comprises a Light Detection and Ranging (LiDAR) sensor of the AV, the area associated with the moving object comprises a field of view (FOV) of the LiDAR sensor of the AV, the sensor located at a fixed location comprises a road-side unit (RSU) LiDAR sensor, and the selected coordinate system comprises a world coordinate system.

In a second main aspect, the invention provides an OBU for an AV operating in a SLAM environment, the OBU comprising a memory for storing machine-readable instructions and a processor for executing said machine-readable instructions such that, on receiving point cloud data for a FOV of a LiDAR sensor of the AV from a LiDAR sensor of a RSU located at a fixed position within a selected coordinate system, the processor configures the OBU to implement the steps of: transforming the received point cloud data to a coordinate system of the AV; matching the transformed point cloud data with point cloud data generated by the LiDAR sensor of the AV; and using the matched point cloud data to determine a corrected position and/or deviation of the AV within the selected coordinate system. The selected coordinate system preferably comprises a world coordinate system.

In a third main aspect, the invention provides an RSU operating in a SLAM environment, the RSU comprising a memory for storing machine-readable instructions and a processor for executing said machine-readable instructions configuring the RSU to implement the steps of: broadcasting notification information indicating that the RSU can provide point cloud data to autonomous vehicles (AVs) in a cover region of the RSU; receiving from an AV data defining a FOV of the LiDAR sensor of the AV and, in response, selecting a subset of point cloud data generated by one or more RSU LiDAR sensors, said subset of the point cloud data comprising points located in the FOV of the LiDAR sensor of the AV; and sending the subset of point cloud data to the OBU of the AV.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
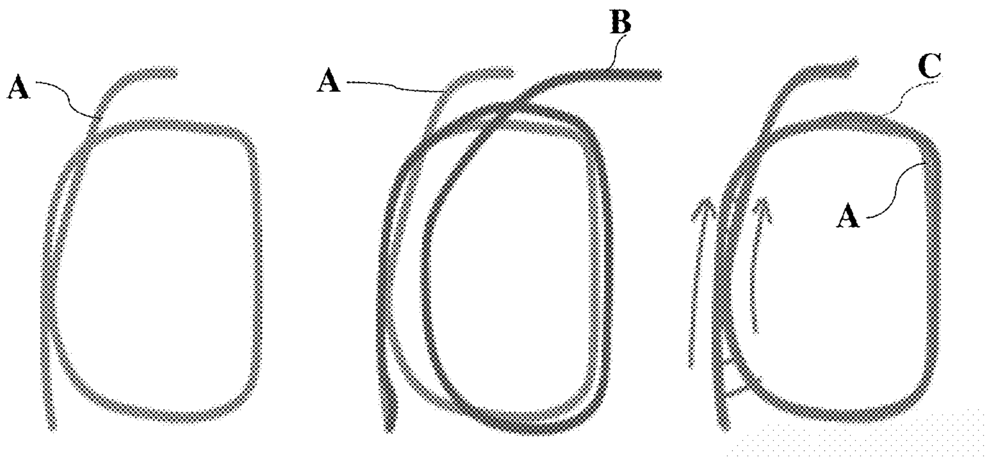
FIG. 1 is a schematic diagram illustrating AV trajectory as detected by the AV OBU compared to the AV trajectory in a world coordinate system.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the figures may be implemented in various forms of hardware, software, or combinations thereof. These elements may be implemented in a combination of hardware and software on one or more appropriately programmed general-purpose devices, which may include a processor, memory, and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of systems or devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

By way of further background, in a traditional SLAM environment or architecture for autonomous driving, it is known to use loop-closure to reduce accumulated errors if an AV revisits a location. When a loop (revisited position) is found, a location-equality condition is added to a back-end bundle adjustment (BA) which performs constrained global optimization over all history keyframes of the AV, in order to minimize accumulated error in the AV's trajectory.

Referring to FIG. 1, AV trajectory A represents the ground truth of the AV's trajectory comprising the AV pose (position and orientation of the AV). This calculated through one or more previous pose estimations for the AV. The back-end optimized trajectory B of the AV can be seen to have drift errors compared to the ground truth trajectory A. Long-term error accumulation will lead to unreliable results in tracking the AV, which means it is not possible to build globally consistent AV trajectories and maps. Thus, in autonomous driving, loop-closure detection is widely used to solve this problem. Using loop-closure detection, the previous back-end optimized AV trajectory B can be corrected and accumulated errors reduced or eliminated as illustrated by AV trajectory C in FIG. 1. However, in loop-closure detection, it is important that careful registration of point cloud data is performed.

Scan context is a popular algorithm for loop-closure detection. A scan context descriptor comprises a global feature descriptor for a point cloud that can be used to detect loop closures. Scan context is a spatial descriptor with a matching algorithm, specifically targeting outdoor place recognition using a single three-dimension (3D) scan by encoding a whole point cloud data in 3D scan into a matrix. This involves, first, a point cloud in a single 3D scan is encoded into scan context. Then, a dimensional vector Nr is encoded from the scan context and is used for retrieving the nearest candidates as well as the construction of the KD (K-dimensional) tree. Nr is the number of rings where the ring is a concept when obtaining the scan context of a frame in point cloud data. Finally, retrieved candidates are compared to a query scan context. The candidate that satisfies an acceptance threshold and is closest to the query is considered the loop. If a loop is detected which satisfies the acceptance threshold and is closest to the query then it is considered the "true value" of a revisited location and is added to the constraints of SLAM pose estimation.

There are many disadvantages of using the traditional loop-closure detection method. The disadvantages include that loop-closure detection highly relies on choosing a key frame from the point cloud data to calculate the similarity between frames to judge whether or not it is the same location, i.e., the revisited location. Loop-closure detection also requires that the AV must arrive at the same position so that the loop-closure can be generated, but, in outdoor environments, it may be a long time before the AV returns to the same position, which means that the deviation correction of loop-closure frequency may be too low to correct accumulated errors over time. Thus, loop-closure detection is often not efficient enough for AV purposes. Furthermore, the comparison of the key frame is not conducted in an accurate world coordinate system, which may lead to a wrong match in loop-closure detection and consequently any deviation of the AV from the world coordinate system may not be eliminated.

Some of the known or traditional methods focus on higher level of errors between different sources such as "missing objects". While that is useful for shared perception problems, the present invention focuses on eliminating sensor deviation errors. In addition, in the known methods, it is common to pre-process the data to simplified formats (i.e., data from the RSUs) before broadcasting the data to road agents. These data often lack sufficient details for sensor error reductions. Known methods also often focus on recording and reporting sensor errors, while the present invention aims to fix sensor deviations in real-time. The known systems do not disclose or suggest the efficient real-time data sharing of data between RSUs and AVs such as requesting the specific data for the AV FOV and segmentation of point cloud data at the RSU based on the AV FOV. Known methods tend to place data matching/correction processes in the RSUs' processing units or in the cloud and to then share it between road agents such as RSUs. The present invention focuses on the correction of AVs' sensors thus the process takes place in every AV separately assisted by the RSUs and is conducted in real-time.

The present invention does not use traditional loop-closure detection because of its many disadvantages. The present invention proposes a novel method for position and/or deviation correction of a moving object in a simultaneous localization and mapping (SLAM) environment. The novel method comprises receiving at the moving object point cloud data for an area associated with the moving object from a sensor located at a fixed location. A processor of the moving object performs the steps of: transforming the received point cloud data to a coordinate system of the moving object; matching the transformed point cloud data with point cloud data generated by a sensor at the moving object for the area associated with the moving object; and using the matched point cloud data to determine a corrected position and/or deviation of the moving object within a selected coordinate system.

In a preferred embodiment, the SLAM environment comprises a road system, the moving object comprises an AV navigating its way around the road system, the processor forms part of an on-board unit (OBU) of the AV, the sensor of the moving object comprises a Light Detection and Ranging (LiDAR) sensor of the AV, the area associated with the moving object comprises a field of view (FOV) of the LiDAR sensor of the AV, the sensor located at a fixed location comprises a road-side unit (RSU) LiDAR sensor, and the selected coordinate system comprises a world coordinate system. Preferably, the world coordinate system is derived from the fixed location of the RSU.

Figure 2:
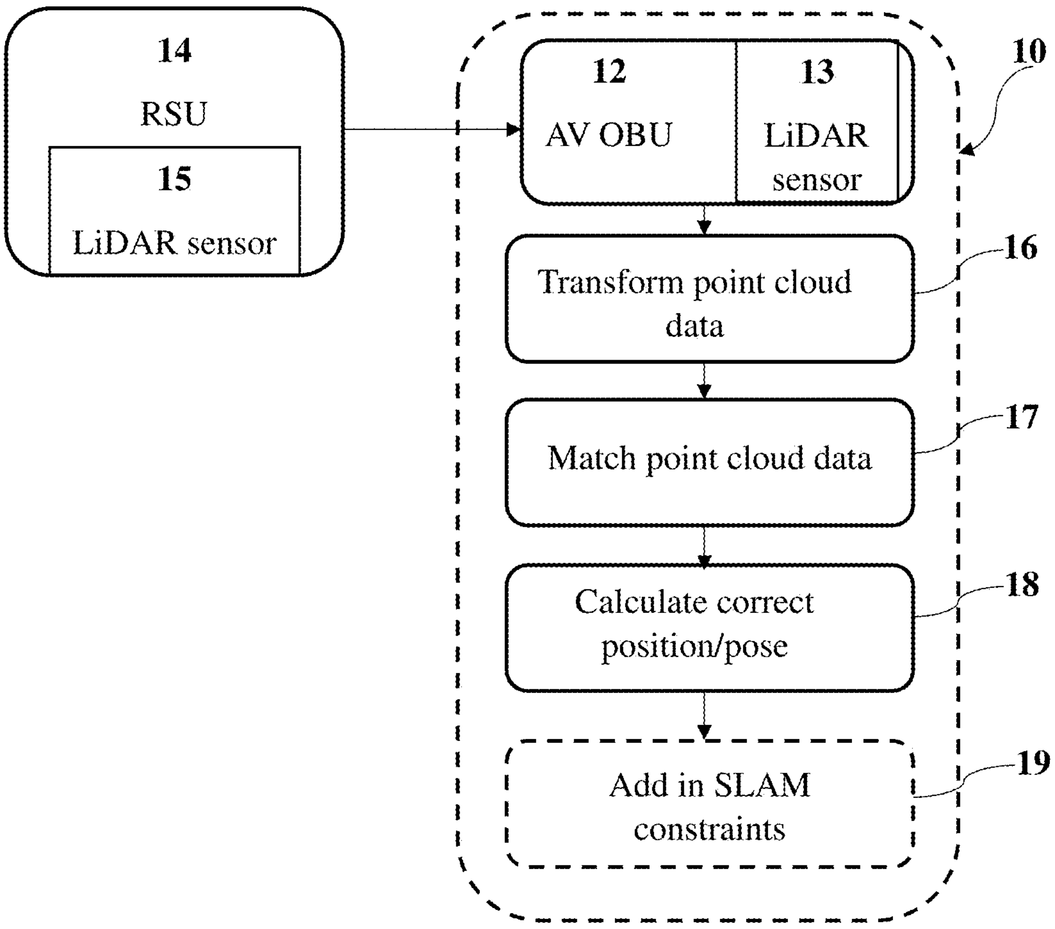
FIG. 2 provides a flow diagram of a method in accordance with the invention.

The preferred embodiment for a general roadside assisted method 10 for autonomous vehicle sensor deviation correction is illustrated by FIG. 2. The AV OBU 12 receives 3D point cloud data from an RSU 14. In a first step 16 of the method 10, the AV OBU 12 transforms the received 3D point cloud data from the coordinate system of the RSU 14 to the coordinate system of the AV. Preferably, the coordinate system of the RSU 14 is a world coordinate system in contrast to a local coordinate system such as that of the AV OBU 12. By "world coordinate system" is meant a coordinate system that is fixed with respect to the location of a LiDAR sensor 15 of the RSU 14. The world coordinate system may use the location of the RSU LiDAR sensor 15 as the X,Y,Z origin point of the world coordinate system. After transforming the point cloud data received from the RSU 14, the AV OBU 12, in a next step 17 of the method 10, attempts to match the point cloud data received from the RSU 14 with point cloud data generated by the LiDAR sensor 13 of the AV OBU 12. After matching the point cloud data, the AV OBU 12, in a next step 18, calculates a correct position/pose for the AV (not shown in FIG. 2) in the world coordinate system. The calculated correct position/pose for the AV in the world coordinate system can be considered the true or truth value in the SLAM constraints. Preferably, the method 10 includes a step 19 of the AV OBU 12 adding the true or truth value in the SLAM constraints. By adding the truth value in the SLAM constraints, the AV OBU 12 can correct deviation of the AV's pose and trajectory.

Figure 3:
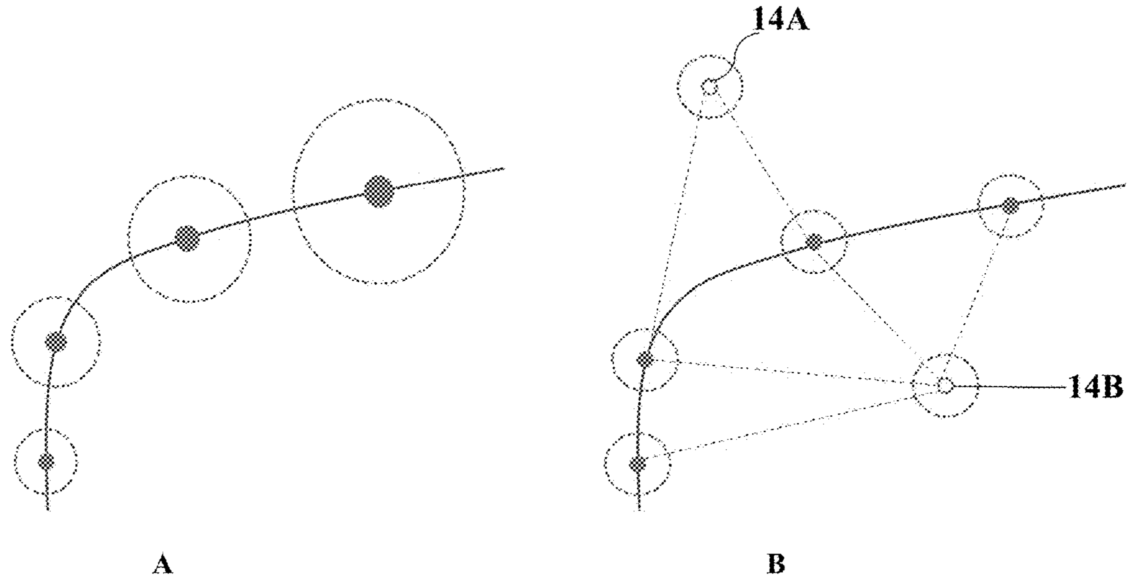
FIG. 3 compares AV trajectory as detected using a traditional SLAM process to a trajectory using the improved SLAM process of the invention.

Graph A of FIG. 3 shows a curved trajectory for the AV (moving object). The curve of the trajectory is built by SLAM. The dashed-line circles are indicative of a level of uncertainty in the trajectory. In this case, because the pose of the AV is calculated from the previous pose which will likely include noise, the level of uncertainty increases as the trajectory progresses. In contrast to the curved trajectory of graph A of FIG. 3, graph B of FIG. 3 shows an equivalent curved trajectory where calculation of the pose is supplemented by using point cloud data from, in this instance, two fixed locations 14A, 14B, e.g., RSUs 14A, B, adjacent the AV. The point cloud data from the two fixed locations 14A, 14B can be used by the AV OBU 12 in the method 10 to correct the deviation of the AV LiDAR sensor 13. Consequently, the level of uncertainty in graph B does not increase or at least increases at a significantly reduced amount compared to the situation represented by graph A of FIG. 3. The method 10 therefore does not need the AV OBU 12 to record historical frames of the point cloud data. Consequently, instead of searching through historical frames of the point cloud data, the RSU 14 provides a reference frame of point cloud data to the AV OBU 12 for AV position/pose correction, i.e., for deviation correction of the AV. The method 10 is more efficient and can be implemented much more quickly than the traditional loop-closure detection method. The method 10 can be implemented in real-time.

Figure 4:
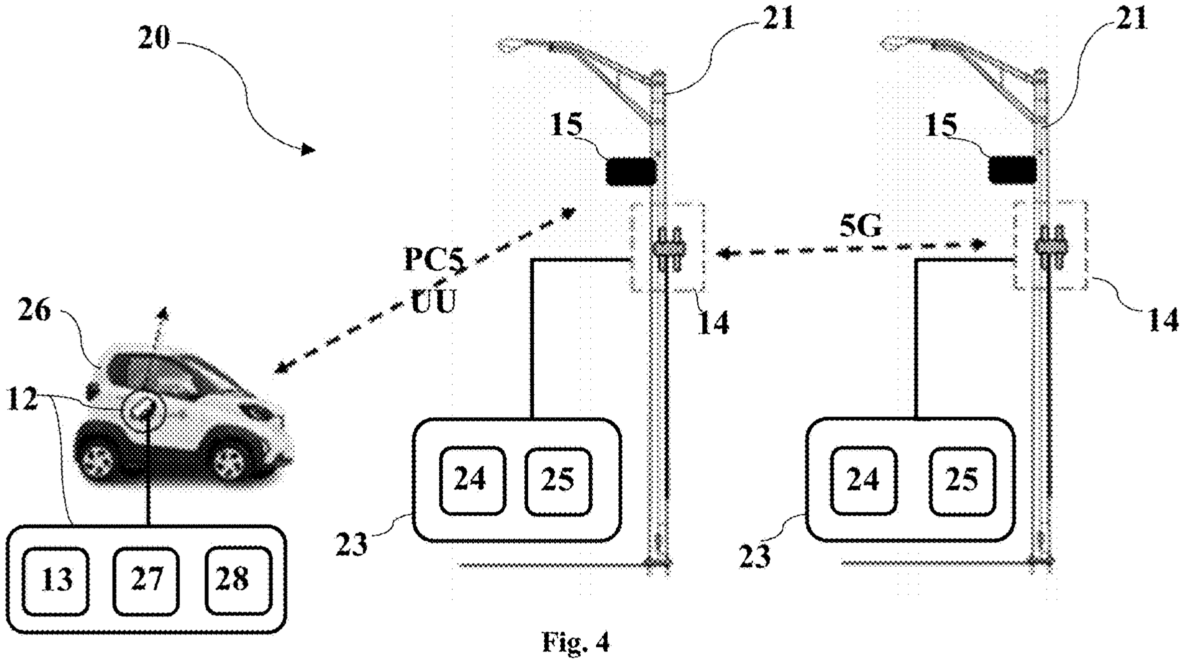
FIG. 4 is a partial view of a road network environment for implementing the method of the invention.
Figure 5:
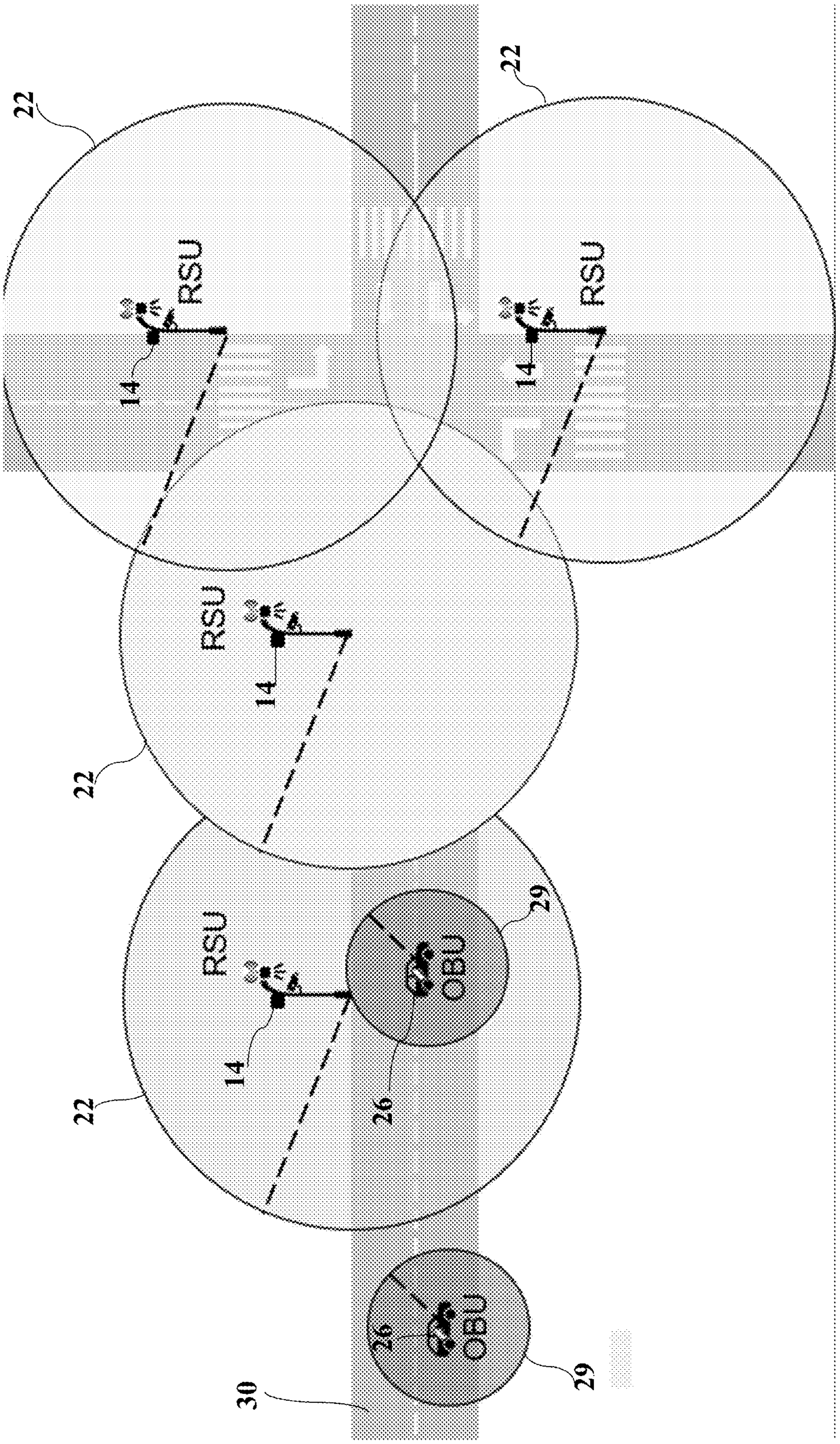
FIG. 5 illustrates respective coverage areas for AV OBUs and RSUs in the method of the invention.

FIG. 4 illustrates part of the SLAM architecture/environment 20 for the preferred embodiment of the invention. The SLAM architecture/environment 20 comprises a plurality of lamp poles or posts 21 distributed beside the road network (not shown in FIG. 4) at fixed locations. Selected lamp poles 21 each have an RSU 14 including an RSU LiDAR sensor 15. The RSU LiDAR sensors 15 collect 3D point cloud data of the surrounding road environment. Each RSU LiDAR sensor 15 has a respective coverage region or area 22 as illustrated in FIG. 5. Each RSU 14 preferably includes an OBU 23 including a memory 24 for storing machine-readable instructions and a processor 25 for executing said machine-readable instructions such as to configure the RSUs 14 to implement the method 10 of the invention. Preferably, all of the 3D point cloud data collected by the RSU LiDAR sensors 15 is combined into a 3D point cloud map which comprises the whole or some of the surrounding road situation covered by the plurality of RSU LiDAR sensors 15. AVs 26 each have an OBU 12 preferably including a memory 27 for storing machine-readable instructions and a processor 28 for executing said machine-readable instructions such as to configure the AV OBUs 12 to implement the method 10 of the invention. Each AV LiDAR sensor 13 has a respective coverage region or area 29 as illustrated in FIG. 5. The AV OBUs 12 preferably communicate with the RSUs 14 via a 5G cellular communication network and preferably use a direct communication interface such as the 5G PC5 UU interface. This enables direct connection between the plurality of A Vs 26 and between AVs 26 and RSUs 14.

As seen in FIG. 5, each RSU LiDAR sensor 15 has a respective coverage region or area 22 in which it generates or collects 3D point cloud data of the surrounding road network 30. The coverage regions or areas 22 preferably overlap. As also seen in FIG. 5, each AV LiDAR sensor 13 has a respective smaller coverage region or area 29 in which it generates or collects 3D point cloud data within the surrounding road network 30 for its FOV. The coverage region or area 29 of the AV LiDAR sensor 13 comprises the FOV of said AV's LiDAR sensor 13. It will be seen that the AV LiDAR sensor coverage region or area 29 is much smaller than the RSU LiDAR sensor 15 coverage region or area 22. Consequently, the point cloud data provided by an RSU 14 to an AV OBU 12 is preferably limited to a subset of all or some of the 3D point cloud data collected by the plurality of RSU LiDAR sensors 15 as it would not be an efficient use of data to provide more RSU generated point cloud data than is relevant to the AV 26. Preferably, the subset of point cloud data provided by the RSU 14 to the AV 26 is a subset of the 3D point cloud data collected by some or all of the plurality of RSU LiDAR sensors 15 where said subset is derived from the 3D point cloud data collected by some or all the plurality of RSU LiDAR sensors 15 based on the FOV of the AV's LiDAR sensor 13.

Figure 6:
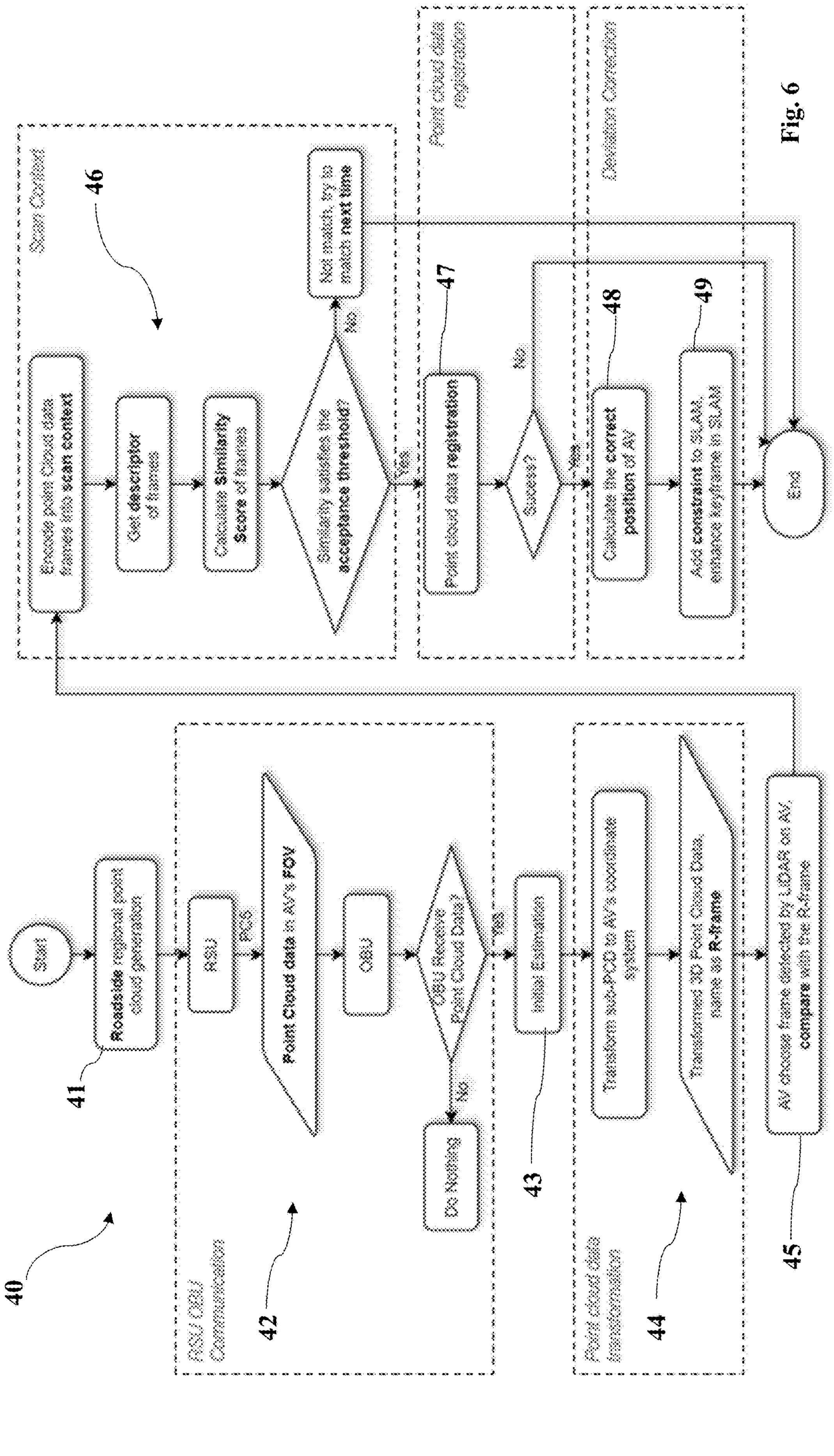
FIG. 6 provides a flow diagram of a preferred method in accordance with the invention.

FIG. 6 illustrates another preferred embodiment of the method of the invention. The method 40 comprises a first step 41 of the plurality of RSU LiDAR sensors 15 generating/collecting respective regional point cloud data to create a dynamic point cloud data map comprising the 3D point cloud data from all or at least some of the plurality of RSUs 14. Preferably, all the lamp poles 21 are equipped with a respective RSU 14. Preferably also, all of the point cloud data collected by the RSUs 14 are combined to form the dynamic point cloud data map. Preferably, prior to the arrival of an AV 26 into any RSU LiDAR sensor's coverage region or area 22, the RSUs 14 in near range communicate with each other to share the 3D point cloud data generated from the data collected by said plurality of RSUs 14. This may include calibrating the point cloud data collected by said RSUs 14 to form the 3D point cloud map of the surrounding road environment. As the point cloud collection of data by the RSU LiDAR sensors 15 changes over time, the data is combined and preferably calibrated to form the 3D point cloud map as the dynamic point cloud map. As the locations of the RSUs 14 are fixed, the detection results, i.e., the point cloud data collection, of the RSU LiDAR sensors 15 is stable assuming that no AV LiDAR sensor 13 point cloud data is included yet.

In a set of next steps 42 of the method 40, when an AV 26 enters a coverage region or area 22 of an RSU 14, the AV OBU 12 sends a request and data defining the AV's LiDAR sensor FOV to the RSU 14. In response, as explained above, the RSU 14 sends relevant point cloud data from the dynamic point cloud map to the AV OBU 12 based on the AV LiDAR sensor's FOV, i.e., coverage area 29.

More specifically, for a preferred embodiment of the method 40, the set of next steps 42 can be broken down into the following steps. When an AV 26 enters a coverage region or area 22 of an RSU 14, the RSU 14 broadcasts notification information to its coverage region 22 indicating that it can provide point cloud data to AVs 26 that are within said coverage region 22. The notification is preferably broadcast on the PC5 UU interface of the 5G cellular network. On receiving the notification, the AV OBU 12 of an AV 26 determines if it is necessary to conduct a deviation correction. If yes, the AV OBU 12 sends a request to said RSU 14 requesting the point cloud data, the request including data defining the FOV (coverage are 29) of the LiDAR sensor 13 of the AV 26. On receiving the request from the AV OBU 12, the RSU 14 matches the received FOV with the dynamic point cloud map by segmenting target point cloud data from the dynamic point cloud map. The RSU 14 does this by selecting points in the dynamic point cloud map which are located within the FOV of the AV LiDAR sensor 13. The RSU 14 then sends the subset of the dynamic point cloud data map to the AV OBU 12. If the AV OBU 12 does not receive any point cloud data from the RSU 14 then the AV OBU 12 takes no further action, i.e., ends the method 40.

Figure 7:
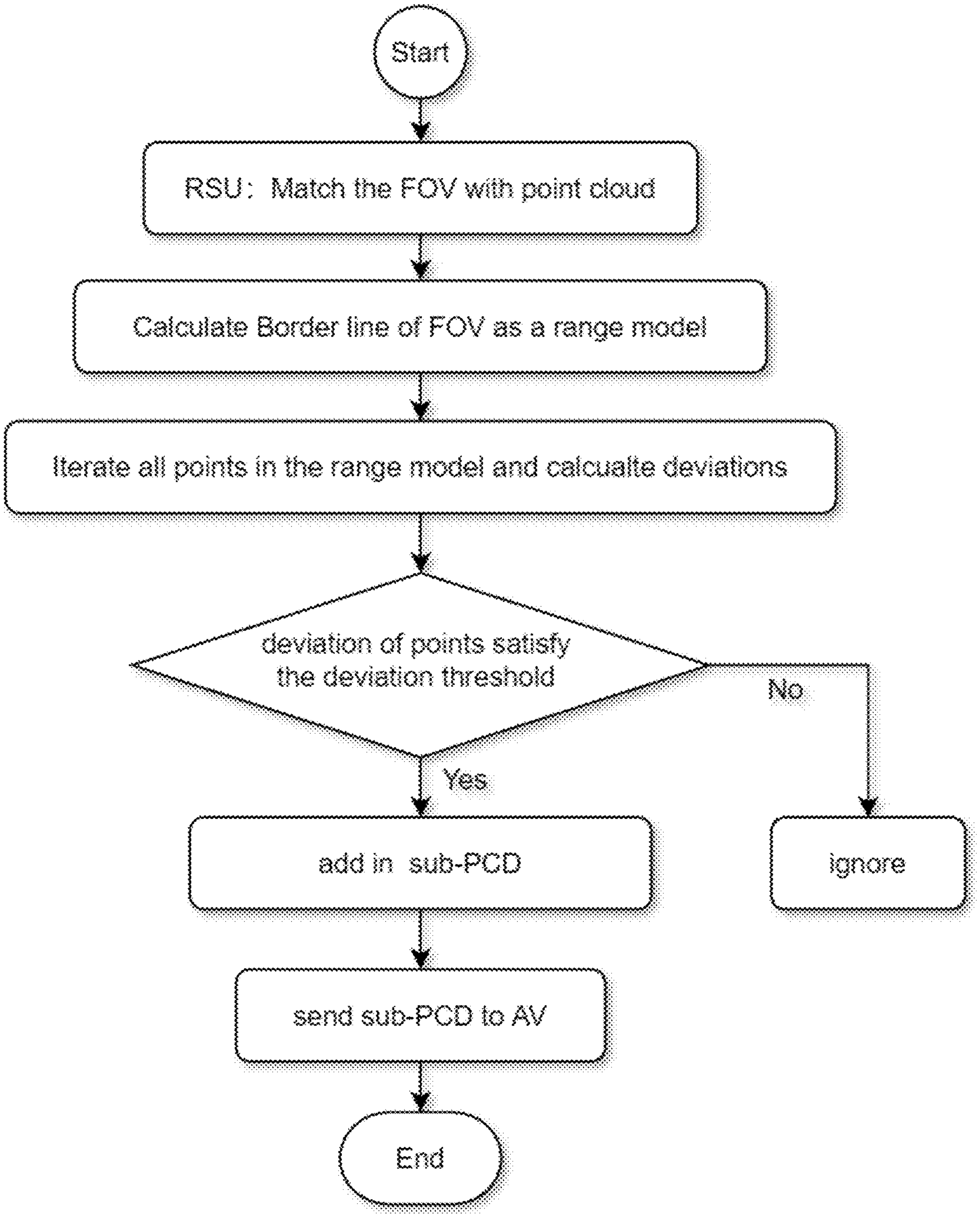
FIG. 7 provides a flow diagram of a point cloud data matching process for the preferred method of FIG. 6.

The process of matching the received FOV at the RSU 14 with the dynamic point cloud map is more fully illustrated in FIG. 7. To match the received FOV with the dynamic point cloud map at the RSU 14 involves the RSU 14, on receiving the request including data defining the FOV of the LiDAR sensor 13 of the AV 26, calculating a border line of the FOV of the LiDAR sensor 13 of the AV 26 as one or more line formulas to define a range model of point cloud data generated by at least some of the plurality of RSUs 14. Then, the RSU 14 iterates all points in the point cloud data defined by the range model to determine or calculate deviations with respect to the world coordinate system of the RSU 14 which received the request, i.e., the RSU 14 whose coverage area 22 the AV 26 is in and with which the AV 26 is in direct communication with. The RSU 14 determines all points which satisfy a deviation threshold and the points which satisfy the deviation threshold are added into a dataset denoted as "sub-PCD" in FIG. 7. The dataset denoted as "sub-PCD" comprises the subset of point cloud data sent by the RSU 14 to the OBU 12 of the AV 26. Preferably, subset of point cloud data ("sub-PCD") sent by the RSU 14 to the OBU 12 of the AV 26 includes point cloud data for any blind spot or spots existing in the point cloud data generated by the LiDAR sensor 13 of the AV 26.

It is worth noting that the data defining the FOV of the AV's LiDAR sensor 13 sent by the AV OBU 12 to the RSU 14 is located in a coordinate system generated in the SLAM process which includes deviations when compared to the world coordinate system. In contrast, as the position of the RSU 14 is fixed, the position of the dynamic point cloud data map can be considered as the ground truth of the world coordinate system. Thus, when the FOV of the AV's LiDAR sensor 13 is used as a basis for segmenting the dynamic point cloud data map, there will be small errors introduced. However, these errors can be ignored as, later in the process, a confidence of point cloud data from comparison is set such that errors introduced here have little effect on the final result.

A further step of the method 40 is for the AV OBU 12 to transform the received subset of point cloud data from the RSU 14 to the coordinate system of the AV 26. However, to aid such a transformation, it is preferred to first obtain an initial estimation for a transformation matrix in a next step 43. The step 43 comprises determining an initial estimation of a transformation matrix $T_i$ comprising a rotation matrix $R_i$ and a translation vector $t_i$ which initially translates the subset of point cloud data to the coordinate system of the AV 26.

The method 40 involves two sets of point cloud data:

$$P=\{p_1,p_2,p_3, \ldots p_n\} \text{ and}$$

$$Q=\{q_1,q_2,q_3, \ldots q_n\}.$$

where P is the point cloud data detected by the AV 26 and Q is the point cloud data collected at the roadside by the RSUs 14. It is necessary to determine the transformation matrix $T_i$ comprising the rotation matrix $R_i$ and the translation vector $t_i$ such that:

$$\forall i, \ldots q_i = Rp_i + t.$$

To do so, it is helpful to determine the corresponding point sets first and construct an objective function by a least squares method for iterative optimization.

Figure 8:
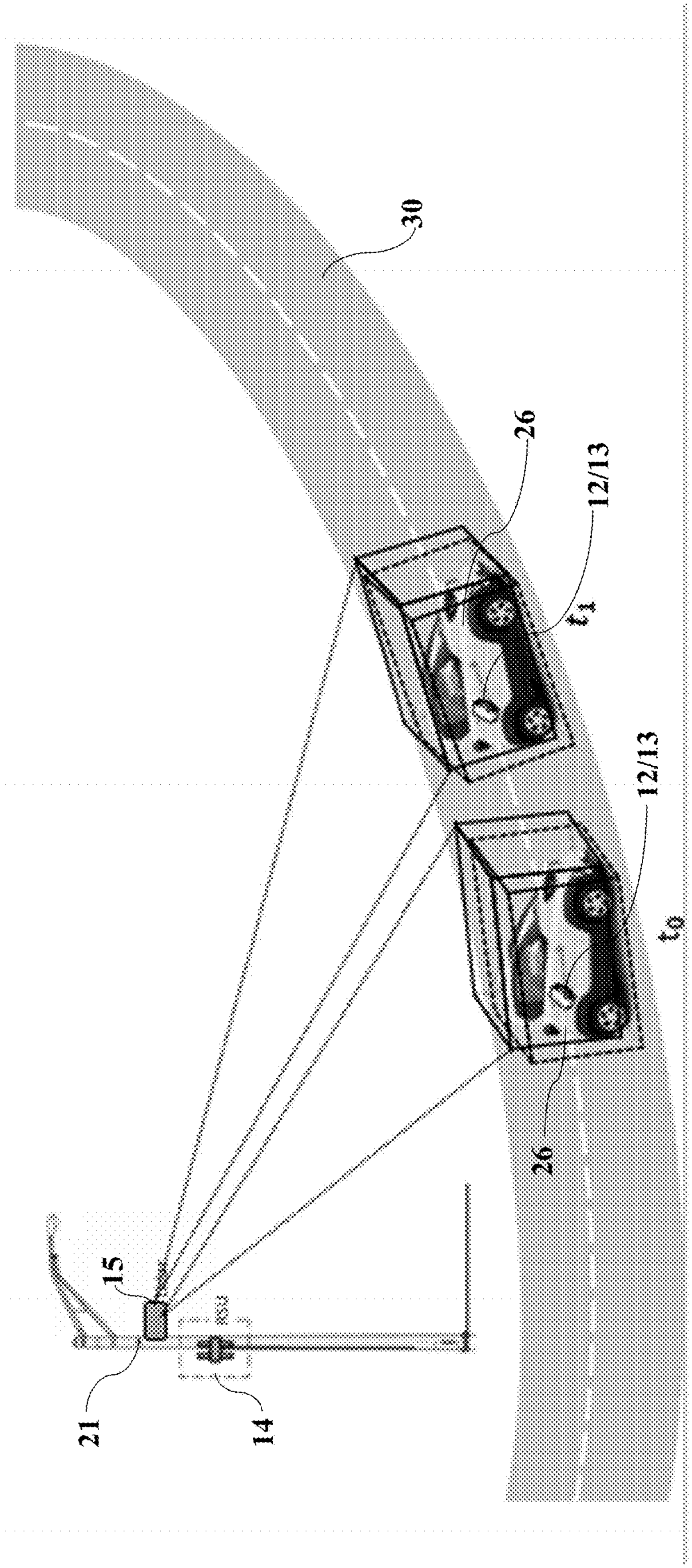
FIG. 8 illustrates a method of obtaining an initial estimation of a transformation matrix for the for the preferred method of FIG. 6.

To improve the success rate of point cloud registration as described later, a good initial estimation is required. Some algorithms for point cloud registration rely heavily on the initial estimation. The point cloud registration may fail because of a wrong initial estimation. Thus, the present invention proposes the following method using V2I (Vehicle to Infrastructure) to improve the initial estimation. Referring to FIG. 8, an AV 26 is driving in the roadway. Assume that the pose of the AV 26 detected by the AV LiDAR sensor 13 at time point $t_0$ is $V_0$ and the pose of the AV 26 at time point $t_1$ is $V_1$. This is indicated by the dashed lines boxes in FIG. 8 associated with the AV 26. The RSU LiDAR sensor 15 on the lamp pole 21 also implements object detection and generates two bounding boxes of the AV 26. These bounding boxes are indicated by the solid line boxes associated with the AV 26 in FIG. 8. Assume that the pose of the AV 26 detected by the RSU LiDAR sensor 15 at $t_0$ is $R_0$ and the pose at $t_1$ is $R_1$. Note that both $R_0$ and $R_1$ are located in the coordinate system of the RSU 14. This results in the transformation matrix $T_v$, which satisfies $V_1=T_v \times V_0$ and the transformation matrix $T_r$ which satisfies $R_1=T_r \times R_0$.

Assume that transformation matrix $T_i$ satisfies:

$$V_0 = T_i \times R_0$$

$$V_1 = T_i \times R_1$$

$T_i$ is the unknown value required.

Combining these formulas with the foregoing formulas provides:

$$V_1 = T_v \times V_0 = T_v \times T_i \times R_0$$

$$V_1 = T_i \times R_1 = T_i \times T_r \times R_0$$

Thus:

$$T_v \times T_i = T_i \times T_r$$

As $T_v$ and $T_r$ are both known, then $T_i$ can be determined to provide a good initial estimation for the transformation matrix $T_i$.

This provides the transformation from the RSU 14 coordinate system to the AV OBU 12 coordinate system, as both the $T_v$ and $T_i$ are estimated values by the AV 26 and the RSU 14 respectively. The transformation matrix $T_i$ is not accurate, but it has been found to be sufficiently accurate to enable the initial estimation and transformation to be implemented. The process of determining an initial estimation of the transformation matrix $T_i$ generally comprises determining respective poses $V_0$, $V_1$ of the AV 26 detected by the LiDAR sensor 13 of the AV 26 at at least two different time points $t_0$, $t_1$ and determining respective poses $R_0$, $R_1$ of the AV 26 detected by the LiDAR sensor 15 of the RSU 14 at said at least two different time points $t_o$, $t_1$. Then, said respective poses $V_0$, $V_1$, $R_0$, $R_1$ at the at least two different time points to, $t_1$ are combined to determine the initial estimation of a transformation matrix $T_i$.

After obtaining an estimated pose for the AV 26 from the AV OBU 12 and from the RSU 14 using the transformation matrix $T_i$, it is possible to further estimate the pose. This can be achieved by adjusting a weight of each pose according to a tracking quality, or dynamically adjusting the weight in a decision tree or a neural network.

Assume the weight of the AV estimated pose is $w_1$, and the weight of the RSU estimated pose is $w_2$, the initial estimation of pose can be obtained from:

$$w_1 \times V_0 + w_2 \times T_i \times R_0 \text{ or}$$

$$w_1 \times V_1 + w_2 \times T_i \times R_1.$$

Returning to FIG. 6, a next set of steps 44 of the method 40 is for the AV OBU 12 to transform the received subset of point cloud data ("sub-PCD") from the coordinate system of the RSU 14 into the coordinate system of the AV 26. On receiving the subset of point cloud data, the OBU 12 of the AV 26 transforms the subset of point cloud data to the coordinate system of the AV 26 to form a reference frame (denoted as "R-frame").

In a next step 45 of the method, the OBU 12 of the AV 26 selects a frame (denoted as "F-frame") of the point cloud data generated by the LiDAR sensor of the AV 26 for its FOV and then compares the F-frame with the R-frame.

In a next set of steps 46 of the method 40, the OBU 12 of the AV 26 compares the F-frame with the R-frame by firstly encoding the point cloud data comprising the F-frame and the point cloud data comprising the R-frame into respective scan context descriptors using a Scan Context Algorithm. Then, determining or calculating a similarity score between the respective scan context descriptors for the F-frame and the R-frame. Then, if the similarity score satisfies an acceptance threshold, proceeding to the next step of the method 40, otherwise end the method 40. Preferably, the selected F-frame comprises a current frame of point cloud data generated by the LiDAR sensor 13 of the AV 26. The method does not require use of the search function in the Scan Context Algorithm.

In a next step 47 of the method 40, the OBU 12 of the AV 26 performs point cloud data registration between the F-frame and the R-frame to obtain their proper or correct transformation matrix T comprising a rotation matrix R and a translation vector t. The transformation matrix T may be used to translate the R-frame point cloud data to the F-frame point cloud data to provide a matched frame of point cloud data for the AV 26 comprising point cloud data generated by the LiDAR sensor 13 of the AV 26 and by one or more or at least some of the RSU LiDAR sensors 15. If the point cloud registration step 47 fails then the method 40 is ended. However, if the point cloud registration step 47 is successful then the method moves to step 48.

In Step 48 of the method 40, the transformation matrix T is used by the OBU 12 of the AV 26 to determine a correct pose of the AV 26 in the world coordinate system. Assume that the pose of the RSU 14 is $P_r$ and the pose of the OBU 12 of the AV 26 is $P_O$, with both $P_r$ and $P_O$ in the world coordinate system. Then, it can be seen that: $T \times P_r = P_o$ and, as $P_r$ is known, the correct value of the pose $P_o$ of the AV OBU 12 in the world coordinate system can be obtained.

After the step 48 of using the transformation matrix T to determine a correct pose of the AV 26 in the world coordinate system, the method 40 preferably includes a step 49 of adding the truth value $P_o$ into the constraints of SLAM. This truth constraint can be used to correct all previous positions estimated by the AV OBU 12 by correcting any deviations accumulated in the previous SLAM processes through a BA mechanism. The matched frame of point cloud data can be used as a key frame of point cloud data for subsequent SLAM processes. Preferably, some RSU generated or collected point cloud data is added to the key frame to provide an enhanced key frame. The enhanced key frame combines point cloud data from both the AV LiDAR sensor 13 and from some or all of the RSU LiDAR sensors 15 to provide an enhanced key frame with much denser data point than would be the case with known and traditional SLAM processes. The enhanced key frame enables the AV OBU 12 to perceive more road environment features including covering or at least reducing blind spots of the AV LiDAR sensor 13. The enhanced key frame also assists with future tracking of the AV 26 and implementing the BA mechanism.

The invention also provides an OBU for an AV operating in a SLAM environment, the OBU comprising a memory for storing machine-readable instructions and a processor for executing said machine-readable instructions to implement the methods of the invention.

The invention also provides an RSU operating in a SLAM environment, the RSU comprising a memory for storing machine-readable instructions and a processor for executing said machine-readable instructions configuring the RSU to the methods of the invention.

Whilst the preferred embodiments of the invention have been described with respect to an AV operating in a road network environment, it will be understood that the methods of the invention may be applied to moving objects in other environments.

Generally speaking, the size of one frame of point cloud will be around 500 KB to 2 MB and the V2X services may need a processing frequency of more than 10 Hz to process the point cloud data. The system of the present invention is advantageous in that it significantly reduces the amount of road-side point cloud data to around 100 KB to 500 KB for transmission with a cooperative arrangement of infrastructure of about 2 to 3 lamp poles as RSUs, and further reduces the size of blind area data to around 10 KB to 50 KB. With such a reduction in size of data transmission, the present invention can be utilized to support collaboration of multiple agents to cover a larger area in real-time.

The modules, units, and devices as described above may be implemented at least in part in software. Those skilled in the art will appreciate that the above described may be implemented at least in part using general purpose computer equipment or using bespoke equipment.

Here, aspects of the method and system described herein can be executed on any system or apparatus comprising the road monitoring system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method for position and/or deviation correction of a moving object comprising an autonomous vehicle (AV) navigating its way around a road system in a simultaneous localization and mapping (SLAM) environment, the SLAM environment comprising the road system, the method comprising the steps of:

receiving at the AV point cloud data for an area associated with the AV from a road-side unit (RSU) Light Detection and Ranging (LiDAR) sensor located at a fixed location, the area associated with the AV comprising a field of view (FOV) of a LiDAR sensor of the AV; and at a processor forming part of an on-board unit (OBU) of the AV, performing the steps of:

transforming the received point cloud data to a world coordinate system of the AV;

matching the transformed point cloud data with point cloud data generated by the LiDAR sensor of the AV for the field of view (FOV) of the LiDAR sensor of the AV; and using the matched point cloud data to determine a corrected position and/or deviation of the AV within the world coordinate system;

wherein the point cloud data received at the OBU of the AV from the RSU comprises a subset of point cloud data generated by one of more RSU LiDAR sensors for an area including the FOV of the LiDAR sensor of the AV; and wherein the step of receiving the point cloud data at the OBU of the AV from the RSU comprises the steps of:

the RSU broadcasting notification information that it can provide point cloud data to AVs in a cover region of the RSU;

on receiving the notification, the OBU of the AV sending a request to said RSU for said point cloud data, said request including data defining the FOV of the LiDAR sensor of the AV;

on receiving the request including data defining the FOV of the LiDAR sensor of the AV, the RSU selecting a subset of point cloud data generated by one of more RSU LiDAR sensors, said subset of the point cloud data comprising points located in the FOV of the LiDAR sensor of the AV; and sending the subset of point cloud data to the OBU of the AV.

2. The method of claim 1, wherein the point cloud data received at the OBU of the AV from the RSU includes point cloud data for any blind spot or spots in the point cloud data generated by the LiDAR sensor of the AV.

3. The method of claim 1, wherein the RSU, on receiving the request including data defining the FOV of the LiDAR sensor of the AV and selecting a subset of point cloud data generated by one of more RSU LiDAR sensors, the RSU directly uses the position of the FOV of the LiDAR sensor of the AV in the coordinate system of the AV and performs the steps of:

calculating a border line of the FOV of the LiDAR sensor of the AV as one or more line formulas to define a range model of point cloud data generated by one of more RSU LiDAR sensors;

iterating all points in the point cloud data defined by the range model to determine or calculate deviations with respect to the world coordinate system; and determining all points which satisfy a deviation threshold, said points which satisfy the deviation threshold comprising the subset of point cloud data sent by the RSU to the OBU of the AV.

4. The method of claim 1, wherein, on receiving the subset of point cloud data, the OBU of the AV transforms the subset of point cloud data to the coordinate system of the AV comprising a reference frame ("R-frame").

5. The method of claim 4, wherein the OBU of the AV selects a frame ("F-frame") of point cloud data generated by the LiDAR sensor of the AV and compares the F-frame with the R-frame by:

encoding the point cloud data comprising the F-frame and the point cloud data comprising the R-frame into respective scan context descriptors using a Scan Context Algorithm; and determining or calculating a similarity score between the respective scan context descriptors for the F-frame and the R-frame.

6. The method of claim 5, wherein the selected F-frame comprises a current frame of point cloud data generated by the LiDAR sensor of the AV.

7. The method of claim 5, wherein, if the similarity score satisfies an acceptance threshold, the method comprises:

performing registration between the respective the point cloud data of the F-frame and the R-frame to obtain a transformation matrix T comprising a rotation matrix R and a translation vector t which translates the R-frame point cloud data to the F-frame point cloud data to provide a matched frame of point cloud data for the AV comprising point cloud data generated by the LiDAR sensor of the AV and by the one of more RSU LiDAR sensors; and using the transformation matrix T to determine a correct pose of the AV in the world coordinate system.

8. The method of claim 7, wherein the resulting matched frame of point cloud data for the AV including the corrected pose of the AV in the world coordinate system is designated a key frame of point cloud data of the AV in the SLAM environment.

9. The method of claim 8, wherein the key frame is used as a constraint in the SLAM environment for the AV to correct accumulated deviations in a trajectory of the AV in the SLAM environment.

10. The method of claim 9, wherein the corrections of the accumulated deviations in the trajectory of the AV in the SLAM environment is implemented using a bundle adjustment (BA).

11. The method of claim 4, wherein, prior to the OBU transforming the subset of point cloud data to the coordinate system of the AV, the method comprises determining an initial estimation of a transformation matrix $T_i$ comprising a rotation matrix $R_i$ and a translation vector $t_i$ which translates the subset of point cloud data to the coordinate system of the AV.

12. The method of claim 11, wherein determining an initial estimation of the transformation matrix $T_i$ comprises:

determining respective poses of the AV detected by the LiDAR sensor of the AV at at least two different time points and determining respective poses of the AV detected by the LiDAR sensor of the RSU at said at least two different time points; and combining said respective poses at the at least two different time points to determine the initial estimation of a transformation matrix $T_i$.

* * * * *